Figure 1:
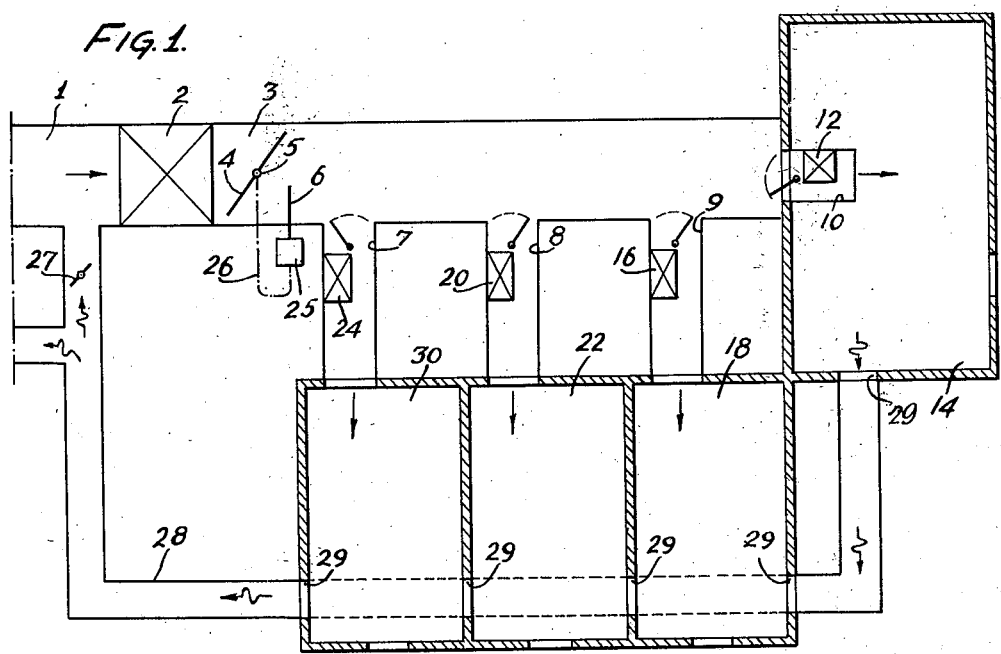
Figure 1:
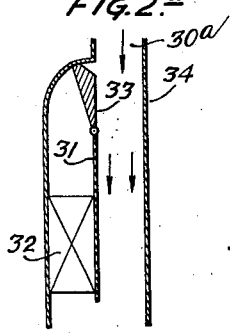
Figure 1:
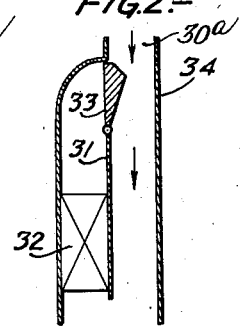
Figure 1:
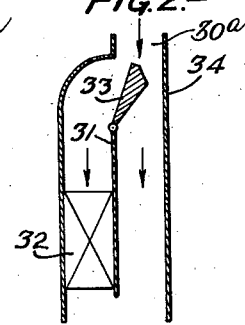
Figure 1:
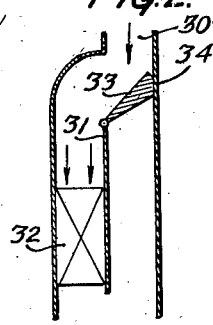
Figure 1:
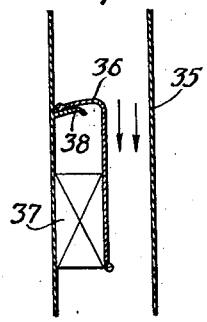
Figure 1:
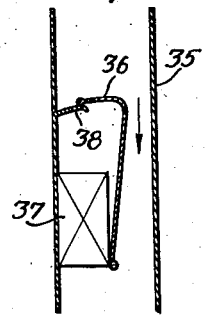
Figure 1:
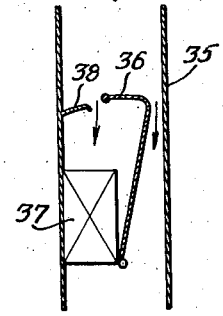
Figure 1:
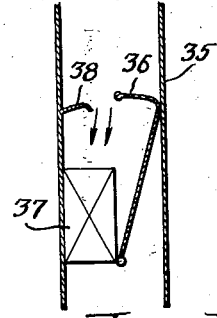

Sept. 17, 1957  H. CONRADI  2,806,675
APPARATUS FOR AIR CONDITIONING
Filed Aug. 1, 1955

FIG. 2.ª    FIG. 2.ᵇ    FIG. 2.ᶜ    FIG. 2.ᵈ

FIG. 3.ª    FIG. 3.ᵇ    FIG. 3.ᶜ    FIG. 3.ᵈ

Inventor:
Henrik Conradi
by Howson & Howson
Attys.

United States Patent Office 2,806,675
Patented Sept. 17, 1957

2,806,675

APPARATUS FOR AIR CONDITIONING

Henrik Conradi, Appelviken, Sweden, assignor to AB Svenska Flaktfabriken, Stockholm, Sweden Application August 1, 1955, Serial No. 525,706

Claims priority, application Sweden June 22, 1950

1 Claim. (Cl. 257—8)

The present invention relates to new and useful improvements in apparatus for air conditioning and more particularly to air conditioning a plurality of rooms by initially conditioning the air in a central air conditioning unit, and providing for the further regulation of the temperature at each individual room. This application is a continuation-in-part of my application filed June 18, 1951, Serial Number 232,114, now abandoned.

According to the physical laws, it is possible to produce a cooling effect on a body by lowering the temperature or by de-humidifying the ambient air, and also by increasing the velocity of the air. The increase of the velocity of the air may be effected either by changing the direction of the air or by increasing the quantity of the air. Prior to the present invention, air conditioning, for instance cooling of a room has usually been accomplished by maintaining the air at a low temperature, and at the same time preventing, as much as possible, excess movement of the air in the room.

The method of the modified invention of air conditioning one or more rooms by injected air which air may be preconditioned in a central air conditioning unit located in a main duct with connected branches for injecting air into each room, is characterized in that the velocity of the air current in the room and the heat content of the air are regulated by one and the same control device and that this device is arranged first to decrease said velocity with the heat content of the injected air remaining constant and subsequently to combine a reduction of the velocity of the air current, effected by a reduction of the quantity of the injected air or by distributing the air over the entire area of the room or both of these steps, with an increase of the heat content of the air effected by an increase of the temperature (or of the humidity or both the humidity and the temperature) of the air, and vice versa by first combining an increase of the velocity of the air current, effected by an increase of the injected air (or by directing said air towards the occupied zone of the room or these steps in combination), with a reduction of the heat content of the air, effected by a reduction of the temperature (or the humidity or both the humidity and the temperature) of the injected air.

Other objects of the present invention and the various features and details of the operation and construction thereof are hereinafter more fully set forth and described with reference to the accompanying drawing in which:

Fig. 1 illustrates diagrammatically an air conditioning or cooling system for cooling a plurality of rooms made in accordance with the present invention;

Figs. 2a to 2d inclusive show one apparatus for carrying out the modified method of the present invention, the individual figures showing the sequence of position from maximum cooling to maximum heating; and, Figs. 3a to 3d show another apparatus for carrying out the modified method, the individual figures being patterned after the figures of Figs. 2a to 2d.

In the embodiment of the invention illustrated in Fig. 1, the entering outdoor air enters the system at 1 and is caused to pass through a central air conditioning unit 2 wherein the air is conditioned to a predetermined temperature and humidity. If desired, the air conditioning unit 2 may be provided with filters for removing dust and destroying bacteria in the entering air. The air is discharged from the air conditioning unit 2 into a main air duct 3 which has a plurality of branch ducts 7, 8, 9, and 10 which lead into a corresponding number of rooms 30, 22, 18, and 14, respectively. A damper 4 is positioned at the forward end of the main duct 3 to control the quantity of air discharged from the air conditioning unit 2 in accordance with the amount of air required in the various rooms. The damper 4 is pivoted at its midpoint as indicated at 5 and the relative position of the damper 4 is controlled by a pressure governor 25. A pressure-responsive member 6 is positioned in the main duct 3 immediately in front of the damper 4 and actuates the pressure governor 25 which in turn controls the position of the damper 4 through connecting mechanism diagrammatically illustrated at 26. When the pressure in the duct 3 is increased, the damper 4 is positioned across the duct thereby decreasing the rate of flow of the air into the duct. In a similar manner, upon a decrease of pressure in the duct, the damper 4 is opened, permitting a greater flow of air. A return duct 28 is provided which is connected with outlet openings 29 in each of the rooms to permit the air to be removed from the rooms. The return duct 28 is connected to the inlet duct and a manually controlled damper 27 is provided to permit a predetermined portion of the air to be recirculated.

In operation, the entering outdoor air 1 is mixed with a portion of the air returning from each of the rooms through the return duct 28 and damper 27 and is conducted through the central air conditioning unit 2 where it is given a predetermined temperature and humidity. From the main duct 3 the air then passes through the branch ducts 7, 8, 9, and 10 to the various rooms where the air is finally conditioned in accordance with the present invention, that is, the condition of the air is correlated with respect to the temperature, humidity, and quantity and direction of injection of the air into the rooms. This is accomplished by providing heating units 12, 16, 20, and 24 along one side of each of the branch ducts 10, 9, 8, and 7, respectively. A damper is provided adjacent the forward end of each of the heating units as illustrated in the drawing and the position of each of the dampers is manually controlled from the individual rooms. By this construction if it is desired to obtain cool air and a rapid rate of circulation of the air in one of the rooms, the damper is moved to a position whereby the air is directed away from the heating unit and directly into the room 30, for example, as shown in the branch duct 7. On the other hand, if it is desired to obtain warm air, the damper is moved to a position whereby the air is directed through the heating unit, for example, as illustrated in the branch duct 10. When the air is passed through the heating unit, it is slowed down considerably and thus the rate of flow of air through the room is decreased. Of course, the air may be caused to pass both directly into the room and through the heater in varying proportions according to the setting of the damper; consequently the temperature and rate of flow of the air may be closely controlled by selectively positioning the dampers in any desired intermediate position.

A preferred modification of the operation of the present invention consists in first changing the quantity of the supplied (induced or injected) air and/or changing the direction of said air, and thereafter changing also the temperature of the air. This changes the cooling effect in a highly economical manner.

It has been found that the comfort of the individual in the room is affected not only by the humidity and temperature or heat content of the conditioning air but also by the rate of flow of the air in the room. By changing the rate of flow prior to the change in heat content of the air, the desired state of air conditioning effect in the room is achieved quickly and economically with a single setting of the control. This eliminates the necessity for a plurality of levers and enables manual control by a relatively unskilled person. In fact, manual control is desirable since automatic regulating devices cannot compensate for the psychological factor of comfort induced by changes in the rate of flow of air in the room.

Figs. 2a to 2d inclusive show one apparatus for carrying out the preferred operation of the invention. In this apparatus, the duct 30a for conducting the air into the individual rooms is partitioned as indicated at 31, thus providing two channels for the flow of the air. A heating unit 32 is positioned in one channel, and the other channel is unobstructed. A damper 33 is pivoted to the partition 31, and as shown, is provided with an enlarged free end portion. The damper is movable between a left limit position in which the flow of air through the heater 32 is cut off, and a right hand limit position in which the flow through the unobstructed channel is cut off, at the same time the flow through the heater is fully open. Fig. 2c illustrates an intermediate position in which the flow is directed partly through the unobstructed channel and partly through the heater. Thus, this apparatus provides means for first changing the quantity of the supplied (induced or injected) air, and thereafter changing the temperature of the air. In other words, when moving the damper 33 from the position shown in Fig. 2a to the position shown in Fig. 2b, the quantity of the supplied air is reduced, and further adjustment of the damper also changes the temperature of the supplied air.

Figs. 3a to 3d inclusive show another apparatus for carrying out the invention. In this apparatus, the branch duct 35 for introducing the conditioned air into the individual rooms is provided with a damper 36 which is L-shaped, and divides the duct 35 into a pair of parallel channels. A heater 37 is positioned in one of these channels and the other of these channels is unobstructed. A wall 38 projects into overlapping relation with the base of the L-shaped damper 36, and cooperates with the damper when it is in its first intermediate position to cut off the flow of air through the heater. Thus, in this apparatus, the same sequential operation of first changing the quantity of the supplied air, and then the temperature of the air is effected.

From the foregoing, it will be observed that the present invention provides a novel apparatus for air conditioning or cooling a plurality of rooms by cooling the air in a central air conditioning unit yet permitting regulation of the sensation of cooling in each of the individual rooms.

I claim:

An air conditioning system for a plurality of independent rooms comprising a common source of pre-conditioned air for said rooms, a duct leading from said source and having independent inlets extending therefrom to each of said rooms, partition means in each of said inlets dividing the inlet into two passages, one of which being provided with a heating means for said pre-conditioned air and the other being free, and means controlling the flow of the supplied air through said passages, said control means consisting of a damper pivoted at said partition means and having its free end provided with means in a first position of the damper blocking flow of air through said heating passage and affording full flow through said free passage, a second position blocking flow of air through said heating passage and limiting flow through said free passage, and a third position proportioning flow between said heating and free passages whereby operation from said first position towards said third position reduces the quantity of air passing through the free passage before directing a part of the supplied air through the heating passage, and vice versa operation from said third position towards said first position increases the quantity of air flowing through the free passage after having entirely shut off flow through the heating passage.

References Cited in the file of this patent

UNITED STATES PATENTS 2,072,166     Goodman _____ Mar. 2, 1937